United States Patent [19]
Jou

[11] Patent Number: 5,325,610
[45] Date of Patent: * Jul. 5, 1994

[54] DRYING APPARATUS

[76] Inventor: Tian F. Jou, No. 328, Changlue Rd., Hsiushui Hsiang, Changhua Hsien, Taiwan

[*] Notice: The portion of the term of this patent subsequent to Aug. 11, 2009 has been disclaimed.

[21] Appl. No.: 894,902

[22] Filed: Jun. 8, 1992

Related U.S. Application Data

[63] Continuation-in-part of Ser. No. 767,077, Sep. 27, 1991, Pat. No. 5,137,042.

[51] Int. Cl.⁵ .............................................. F26B 11/12
[52] U.S. Cl. ................................................ 34/182; 134/65
[58] Field of Search ................. 34/180, 179, 181, 182, 34/183; 134/65, 66, 132

[56] References Cited
U.S. PATENT DOCUMENTS 2,264,390  12/1941  Levine et al. .................... 34/180
5,137,042  8/1992  Jou .................................. 134/65

Primary Examiner—Henry A. Bennett

[57] ABSTRACT

The present invention provides a drying apparatus which has a conveying device, a drying-and-conveying device, a housing, a sealing device, an auxiliary cleaning device and an auxiliary drying device. The conveying device conveys pieces of plastic waste mixed with waste water from a first end towards a second end thereof. The drying-and-conveying device casts the waste water thereout while conveying the pieces of plastic waste. The housing has a first section which receives the pieces of plastic waste and a second section which receives the waste water. The sealing device retains the pieces of plastic waste within the drying-and-conveying device when desired. The auxiliary cleaning device urges water into the drying-and-conveying device for further washing the pieces of plastic waste. Hereinafter, the auxiliary drying device urges a hot air current into the drying-and-conveying device for auxiliary drying the pieces of plastic waste.

2 Claims, 2 Drawing Sheets

DRYING APPARATUS

BACKGROUND OF THE INVENTION

The present application is a continuation-in-part application of co-pending U.S. patent application Ser. No. 07/767,077 filed Sep. 27, 1991, now U.S. Pat. No. 5,137,042, granted Aug. 11, 1992.

U.S. patent application Ser. No. 07/767,077 teaches a preparatory machine for recycling which has a first cleaning device, a second cleaning device, a drying device, and a collecting device. The present application relates to a preparatory machine for recycling which has a first cleaning device, a second cleaning device, and a drying apparatus, and, more particularly, to the drying apparatus. The first and second cleaning devices of the present application are the same as those of U.S. patent application Ser. No. 07/767,077. In accordance with the present application, the drying apparatus is derived from a combination of the drying device with the collecting device of U.S. patent application Ser. No. 07/767,077.

SUMMARY OF THE INVENTION

The present invention provides a drying apparatus which has a conveying device, a drying-and-conveying device, a housing, a sealing device, an auxiliary cleaning device and an auxiliary drying device. The conveying device conveys pieces of plastic waste mixed with waste water from a first end towards a second end thereof. The drying-and-conveying device casts the waste water thereout while conveying the pieces of plastic waste. The housing has a first section which receives the pieces of plastic waste and a second section which receives the waste water. The sealing device retains the pieces of plastic waste within the drying-and-conveying device when desired. The auxiliary cleaning device urges water into the drying-and-conveying device for further washing the pieces of plastic waste. Hereinafter, the auxiliary drying device urges a hot air current into the drying-and-conveying device for auxiliary drying the pieces of plastic waste.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
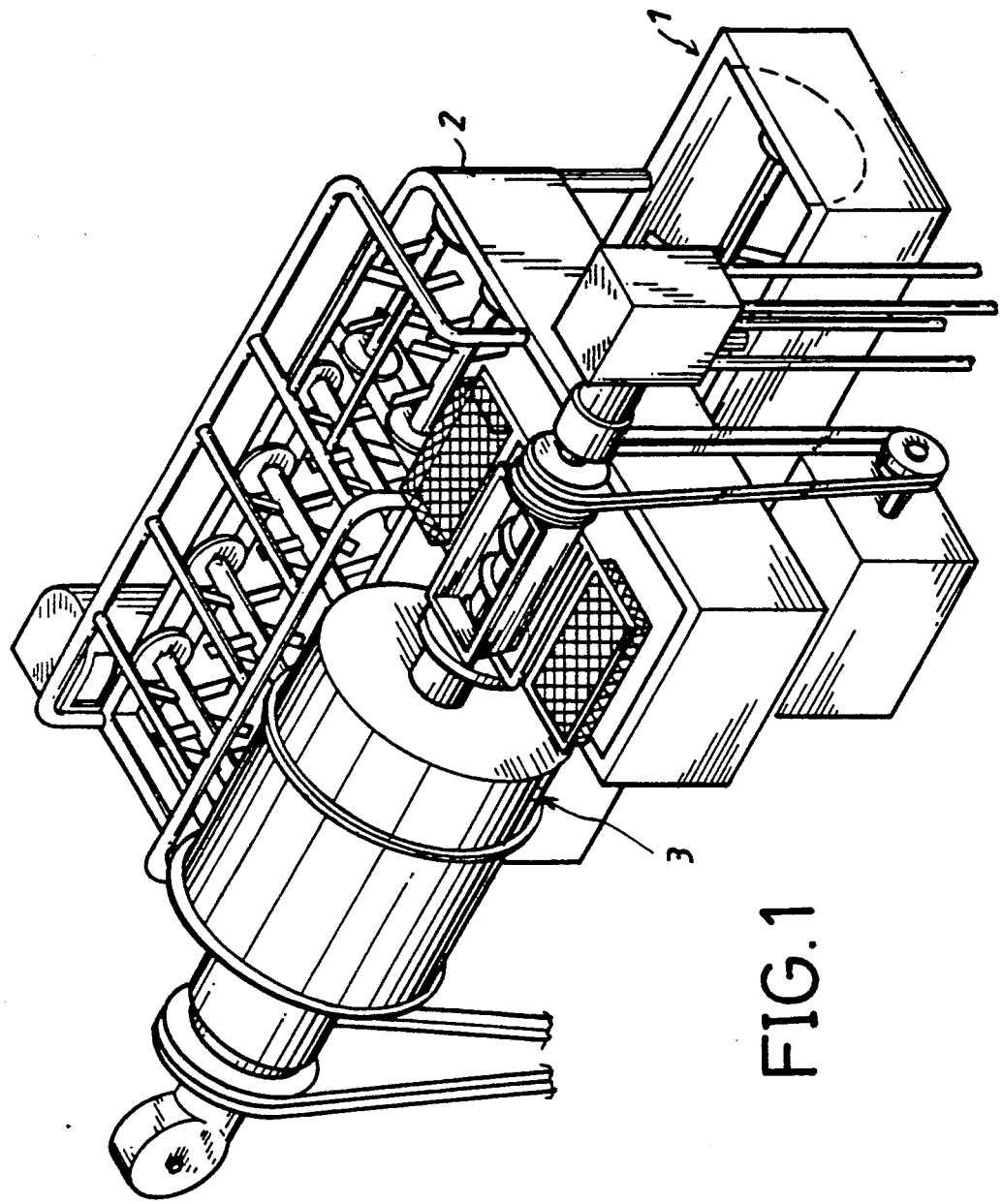
FIG. 1 is a perspective view of a preparatory machine for recycling employing a drying apparatus in accordance with the present invention.

Referring to the drawings and, more particularly, to FIG. 1, a preparatory machine for recycling is shown in a perspective view, having a first cleaning device 1, a second cleaning device 2, and a drying apparatus 3 in accordance with the present invention.

The cleaning devices 1 and 2 are exactly the same as those of co-pending U.S. patent application Ser. No. 07/767,077 and, therefore, a detailed description thereof will not be given in this specification. However, a brief description of the cleaning devices 1 and 2 helps understand how the preparatory machine for recycling operates and, more particularly, how the drying apparatus 3 works. Generally, pieces of plastic waste are washed with detergent in the first cleaning device 1 while being conveyed towards the second cleaning device 2. Then, the pieces of plastic waste are washed with water in the second cleaning device 2 while being conveyed towards the drying apparatus 3. A pair of co-planar nets spoon the pieces of plastic waste mixed with some waste water into the drying apparatus 3.

Figure 2:
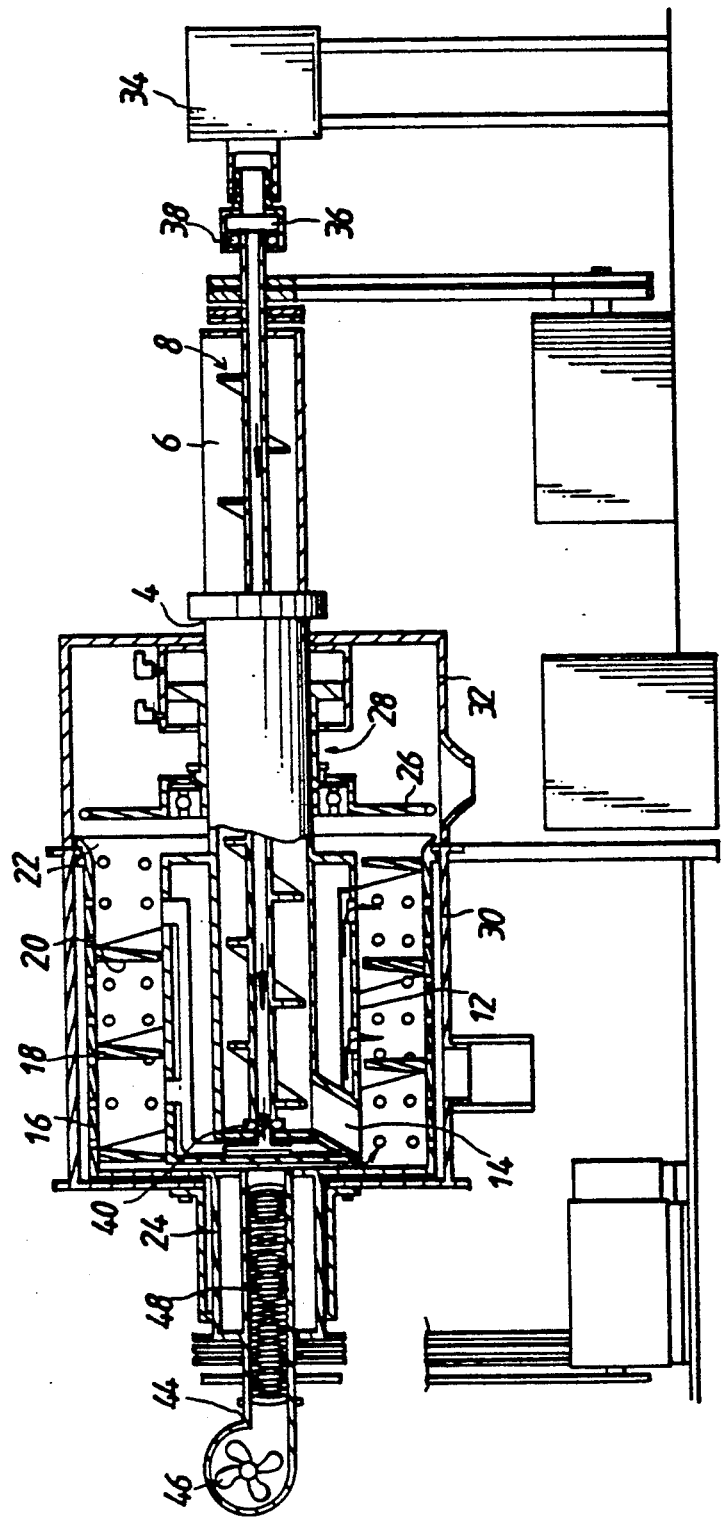
FIG. 2 is a partially exploded view of a drying apparatus in accordance with the present invention.

Further referring to FIG. 2, the drying apparatus 3 has a conveying device for conveying the pieces of plastic waste mixed with the waste water into a drying-and-conveying device to be dried. The conveying device has a tube 4 which is horizontally installed and retained steady in operation. The tube has a first section wherein an up-facing inlet 6 is defined and a second section wherein a down-facing outlet is defined. A conveyor screw 8 has a hollow shaft co-axially and rotatably mounted within the tube 4. A dummy cylinder 12 co-axially encloses the second section of the tube 4. A tunnel 14 extends from the down-facing outlet and penetrates the dummy cylinder 12.

The pieces of plastic waste mixed with the waste water are dropped from the nets into the pipe 4 through the inlet 6. The pieces of plastic waste mixed with the waste water are then conveyed from the inlet 6 towards the tunnel 14 when the conveyor screw 8 is rotated by means of a motor through a pulley-and-belt assembly. The pieces of plastic waste mixed with the waste water are then dropped downwards from the tube 4 through the tunnel 14.

The drying-and-conveying device has a cylinder 16 with a plurality of apertures 18 and a screw 20 extending on an inner surface of the cylinder 16. An opening 22 is defined at an end of the cylinder 16 and a hollow shaft 24 co-axially extends from the other end of the cylinder 16. The cylinder 16 is co-axially mounted around the second section of the tube 4.

The hollow shaft 24 is adapted to be rotated by means of another motor through another pulley-and-belt assembly, thereby rotating the cylinder 16 and the screw 20. Thus, the cylinder 16 casts the waste water through the apertures 18 while the screw 20 conveys the pieces of plastic waste towards the opening 22.

A hydraulic device 26 is mounted on the tube 4. A annular cover 28 is attached to and actuatable by the hydraulic device 26 to move along the tube 4. In a first position, the annular cover 28 releases the opening 22 and in a second position, the annular cover 28 seals the opening 22, thereby retaining the pieces of plastic waste in the cylinder 16.

A housing has a first section 30 and a second section 32. The first section 30 co-axially encloses the cylinder 16 and the hollow shaft 24 and the second section 32 co-axially encloses the cover 26 and the hydraulic device 28. The first section 30 and the section 32 are connected to each other to form the housing.

The above-mentioned elements have been discussed in co-pending U.S. patent application Ser. No. 07/767,077, so that further description thereof is omitted in this specification.

An auxiliary cleaning device is adapted for further washing the pieces of plastic waste. A steadily installed pump 34 has at least an input pipe which communicates with a water source (not shown). A threading extends on an inner surface of the pipe of the pump 34. A hollow joint 36 consists of integral first and second sections. A threading extends on an outer surface of the first section of the hollow joint 36. The threading of the first section of the hollow joint 36 engages with the threading of the output pipe of the pump 34, thereby attaching the hollow joint 36 to the pump 34.

Two conventional water-tight bearings 38 and 40, e.g., roller bearings or ball bearings, enable the hollow shaft of the conveyor screw 8 to rotate thereon. Similar to any roller or ball bearing, the bearings 38 and 40 each have an outer ring, an inner ring and a plurality of rollers or balls which rotate between the outer and inner rings. The outer ring of the bearing 38 is attached within the second section of the hollow joint 36. The outer ring of the bearing 40 is attached to an end wall of the tube 4. The hollow shaft of the conveyor screw 8 is attached to the inner ring of the bearing 38 at a first end and attached to the inner ring of the bearing 40 at a second end.

The end wall of the tube 4 defines a hole which is aligned with the hollow shaft of the conveyor screw 8. A plurality of pipes 42 each have an end communicating with the hole at the end wall of the tube 4 and a plurality of nozzles. Each pipe 42 extends between the tube 4 and the dummy cylinder 12 with the nozzles thereof facing the dummy cylinder 12. The dummy cylinder 12 has a plurality of holes each corresponding to a nozzle of the pipes 42 to thereby permit the nozzles of the pipes 42 to spread water through the holes of the dummy cylinder 12.

To further wash the pieces of plastic waste, the hydraulic device 26 urges the annular cover 28 to seal the opening 22. The pieces of plastic waste are retained within the cylinder 16. The pump 34 urges water from the water source through the hollow joint 36, the hollow shaft of the conveyor screw 8 and the pipes 42. The nozzles of the pipes 42 spread the water through the holes of the dummy cylinder 12, thereby spraying the pieces of plastic waste. Thus, the pieces of plastic waste are further washed.

An auxiliary drying device is adapted for sufficiently drying the pieces of plastic waste. The auxiliary drying device has a shell 44 which has a drum communicating with a barrel. The barrel extends co-axially through the hollow shaft of the cylinder 16. A fan 46 is mounted within the drum for urging an air current through the barrel. A heater 48, i.e., a thermal resistor, is mounted within the barrel for heating the air current passing therethrough.

The pump 34 is disabled when the pieces of plastic waste are sufficiently cleaned. The fan 46 urges an air current towards the cylinder 16. The heater 48 heats the air current when the air current passes therethrough. The heated air current is induced to the cylinder 16, thereby helping dry the washed pieces of plastic waste. The hydraulic device 26 urges the annular cover 28 to open the opening 22, thereby permitting the pieces of plastic waste to be moved out of the cylinder 16.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A drying apparatus comprising:
   (a) conveying means comprising (i) a tubular member consisting of a first section providing an inlet through which recyclable pieces mixed with water can be introduced into said tubular member and a second section providing an outlet through which recyclable pieces mixed with water can be discharged from said tube and (ii) a conveyor screw rotatably supported in said tubular member for moving recyclable pieces mixed with water from said inlet toward said outlet;
   (b) drying and conveying means comprising (i) a cylinder enclosing said second section of said tubular member for receiving the recyclable pieces mixed with water discharged from said tubular member of said conveying means, said cylinder having a number of apertures formed therein, (ii) a helical screw conveyor within said cylinder so that relative rotation of the screw conveyor conveys the recyclable pieces therethrough while allowing the water to discharge through said apertures therein; and
   (c) a housing comprising (i) a water collecting section enclosing said cylinder for collecting water discharged through said apertures and (ii a recyclable piece-collecting section sealingly attached to said water collecting section for collecting the recyclable pieces from said cylinder and having an outlet for discharging recyclable pieces from said housing.

2. A drying apparatus in accordance with claim 1, further comprising a hydraulic device attached around said first section of said tubular member and an annular cover attached to and actuatable by said hydraulic device for sealing said cylinder, thereby retaining the recyclable pieces within said cylinder.

* * * * *